United States Patent [19]

Wagner et al.

[11] Patent Number: 5,719,759

[45] Date of Patent: Feb. 17, 1998

[54] DC/AC CONVERTER WITH EQUALLY LOADED SWITCHES

[75] Inventors: Bernhard Wagner, Hamburg; Heinz Van Der Broeck, Zülpich, both of Germany

[73] Assignee: U.S. Philips Corporation, New York, N.Y.

[21] Appl. No.: 413,058

[22] Filed: Mar. 29, 1995

[30] Foreign Application Priority Data

Apr. 15, 1994 [DE] Germany .......... 44 13 163.1

[51] Int. Cl.[6] .......... H02M 7/5387
[52] U.S. Cl. .......... 363/132; 363/98
[58] Field of Search .......... 363/17, 41, 98, 363/132

[56] References Cited

U.S. PATENT DOCUMENTS

| Re. 33,866 | 3/1992 | Schutten et al. | 363/17 |
|---|---|---|---|
| 4,691,272 | 9/1987 | Geus | 363/98 |
| 4,706,177 | 11/1987 | Josephson | 363/132 |
| 4,835,353 | 5/1989 | Smith | 363/98 |
| 4,901,216 | 2/1990 | Small | 363/132 |
| 5,157,592 | 10/1992 | Walters | 363/17 |
| 5,315,498 | 5/1994 | Berrios et al. | 363/98 |
| 5,365,422 | 11/1994 | Close et al. | 363/98 |
| 5,379,209 | 1/1995 | Goff | 363/132 |
| 5,420,781 | 5/1995 | Schmidt | 363/17 |
| 5,438,498 | 8/1995 | Ingemi | 363/17 |
| 5,442,540 | 8/1995 | Hua et al. | 363/132 |

OTHER PUBLICATIONS

"Power Electronics", N. Mohan, T.m. Undeland, Wp. P. Robbins, Dec. 1989, John Wiley & Sons, p. 123.

Primary Examiner—Jeffrey L. Sterrett
Attorney, Agent, or Firm—Edward Blocker

[57] ABSTRACT

A circuit arrangement comprises an inverter with two parallel switching branches which are connected to a DC voltage source and each of which comprises two series-connected switching members, each of which comprises at least one switch and an anti-parallel connected diode. A switching member in one switching branch each time constitutes a diagonal pair in conjunction with a switching member in the other switching branch. A load with a given polarity is connectable to a DC voltage source via the diagonal pair. The voltage on the load temporarily becomes zero upon the change-over from one polarity to the other. A control circuit is provided for opening and closing the switches in a manner such that the switching members are successively switched on and off. The switching members are more uniformly stressed because the control circuit is constructed so that all of the switching members are successively switched on as the second switching member in their diagonal pair or all of the switching members are successively switched off as the second switching member in their diagonal pair.

19 Claims, 3 Drawing Sheets

DC/AC CONVERTER WITH EQUALLY LOADED SWITCHES

BACKGROUND OF THE INVENTION

This invention relates to a circuit arrangement which comprises an inverter with two parallel switching branches which are connected to a DC voltage source and each of which comprises two series-connected switching members, each of which comprises at least one switch and an antiparallel-connected diode, a switching member in one switching branch each time constituting a diagonal pair in conjunction with a switching member in the other switching branch, a load with a given polarity being connectable to a DC voltage source via said diagonal pair, the voltage on the load temporarily disappearing upon the change-over from one polarity to the other, and also comprises a control circuit for opening and closing the switches in a manner such that the switching members are successively switched on and off.

A circuit arrangement of this kind is known, for example, from the book "Power Electronics", N. Mohan, T. M. Undeland, W. P. Robbins, 1989, John Wiley & Sons, page 123.

Therein, a "switching member" denotes a combination which comprises one or more parallel and/or series-connected switches which can be switched on and off (for example, an IGBT, a MOS transistor, or another semiconductor switch) and a diode (free running diode) which is connected parallel thereto and which is operated in the reverse direction by the DC voltage source. Therein, a "diagonal pair" is formed by two switching members which are arranged in different switching branches and via which the load can be connected to the terminals of a DC voltage source, one diagonal pair conducting the DC voltage to the load with a first polarity whereas the other diagonal pair conducts the DC voltage thereto with a second polarity which opposes the first polarity.

In circuits of this kind electric energy is converted into heat in the switching members during operation. In addition to a component arising during the current-carrying phase (line losses), these energy losses include a component which arises during the switching operations (switching losses). The switching losses occur during the switching operations when a substantial current flows through the switching member or a substantial voltage is present on its terminals. The switching losses are proportional to the switching frequency.

It is known that such switching losses can be reduced by using relieving networks or so-called snubber circuits. However, such snubber circuits fail or affect the operation of the inverter if they must be designed on the one hand for very large currents and on the other hand for very small currents and if the DC voltage source can also have different voltage levels. Requirements of this kind are imposed, for example, in the case of an X-ray generator.

If the cited known circuit arrangement were constructed without such snubber networks for these reasons, comparatively high thermal stress of the switches could occur due to loss-inducing and substantially loss-free switching on and off, which thermal stress could also be different for the switches of the inverter, depending on the control method. A loss-inducing switching operation occurs each time for the switching member which is switched second within the relevant diagonal pair because the full DC voltage is present across this switching member prior to switching on. Loss-inducing switching off occurs for the switching member which is switched off first in a diagonal pair because this member still carries the full current at the instant of switching off. In the known circuit the switching members in one switching branch are switched off in a loss-inducing manner and the switching members in the other switching branch are switched off in a loss-inducing manner. Moreover, in dependence on the relevant working point, different current variations occur in the switches and diodes of the two switching members, so that different forward power losses occur. Such irregular thermal stress of the switches limits the maximum power of the inverter because the current through the switching members may be only as large as permitted by the switch member stressed most.

SUMMARY OF THE INVENTION

It is an object of the present invention to construct a circuit of the kind set forth in such a manner that the switching members are stressed equally.

This object is achieved in accordance with the invention in that the control circuit is constructed so that all of the switching members are successively switched on as the second switching member in their diagonal pair or all of the switching members are successively switched off as the second switching member in their diagonal pair.

When the switching members in the two diagonal pairs are thus alternately switched on and off four times in succession, each switching member performs a loss-inducing and a quasi loss-free switching on and switching off operation. Furthermore, equally large average and rms values of the currents thus occur in all switches, so that the conducting and switching losses are always identical in all switches. As a result, all four switches are uniformly thermally stressed so that larger currents or a higher maximum inverter power are permissible.

In a preferred further embodiment of the invention the control circuit is constructed so that the following switching cycle occurs after the switching on of both switching members of a first diagonal pair:

a) opening of the first switching member of the first diagonal pair, b) closing of the series-connected switching member of the second diagonal pair, c) opening of the second switching member of the first diagonal pair, d) closing of the series-connected switching member of the second diagonal pair.

In this embodiment of the invention it is achieved that during freewheeling, i.e. between the trailing edge of a voltage pulse on the load and the leading edge of the subsequent voltage pulse of opposite polarity, no energy whatsoever can be fed back from the load into the DC voltage source as would be the case if first the switches of one diagonal pair were successively switched off and subsequently the switching members of the other pair were switched on. Because the electric power thus does not oscillate between the load and the DC voltage source, for each voltage pulse the load has to be fed only with the power actually required (and not also with the electric power subsequently fed back into the DC voltage source again). In comparison with an inverter involving such power oscillating the conducting losses are thus reduced further and, moreover, the line losses are also reduced because the rms value of the currents is smaller.

In a further embodiment of the invention, the inverter is constructed as a series resonant inverter. The invention is in principle also suitable for any other inverter type. It is only essential that the direction of the load current is reversed between the lagging edge of a voltage pulse and the leading edge of the subsequent voltage pulse.

Because of this condition, the switching frequency can be changed to a limited extent only. Therefore, a further embodiment which is suitable for power control is characterized in that it comprises a pulse width modulator for controlling the switching period of the two diagonal pairs.

A preferred embodiment of the invention is characterized in that it comprises means for generating a first periodic and pulse-shaped signal whose leading edge determines the switching off of the switching member switched last in a diagonal pair, means for generating a second periodic and pulse-shaped signal whose leading edge has been delayed a defined period of time relative to the lagging edge of the first signal and which defines the switching on of the switching member switched first on in the other diagonal pair, its lagging edge determining the switching off of the switching member switched off first in this diagonal pair, and means for generating a third periodic signal whose trailing edge has been delayed a defined period of time relative to the lagging edge of the second signal (PWM) and defines the switching on of the switching member switched on first in the one diagonal pair.

It is thus ensured that even in the case of delays which are not negligibly small in comparison with the period duration of the voltage, the positive pulses on the load are exactly as long as the negative pulses. In the cited known circuit, however, in such a case an asymmetrical duration would occur.

Because a circuit arrangement in accordance with the invention notably satisfies the requirements to be imposed on an X-ray generator, a further embodiment thereof is used in an X-ray generator for generating the high voltage for an X-ray tube.

BRIEF DESCRIPTION OF THE DRAWINGS

The invention will be described in detail hereinafter with reference to the drawings. Therein.

DESCRIPTION OF THE PREFERRED EMBODIMENTS

Figure 1:
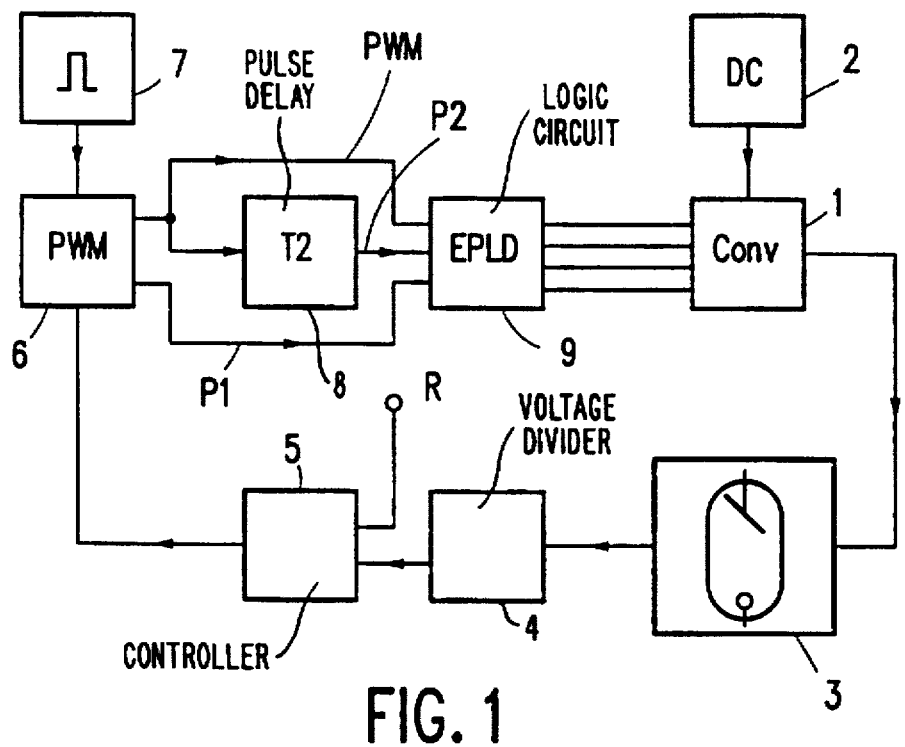
FIG. 1 shows a block diagram of a control circuit of an X-ray generator in which the invention can be used.

The reference numeral 1 in FIG. 1 denotes an inverter which is connected to a DC voltage source 2. The inverter 1 generates the high voltage for an X-ray source 3 via a high voltage transformer and a rectifier unit (not shown). The power delivered to the X-ray source 3 by the inverter is not only dependent on the high voltage on the X-ray source but also on the current through the X-ray source, which current can be varied in a range of several powers of ten. The voltage on the X-ray tube 3 is measured by a high voltage measurement divider 4.

A controller 5 generates a control signal which is dependent on the difference between said measurement value and a reference value R and is applied to a pulse width modulator 6. The pulse width modulator operates at a fixed frequency of, for example, 40 kHz supplied by a clock generator 7. On a first output it supplies a square-wave signal PWM of clock frequency whose width is determined by the control signal. On a second output the pulse width modulator supplies square-wave pulses P1 which are synchronized with the clock frequency and whose leading edge leads the leading edge of the square-wave pulses PWM by a period T1. The signal PWM is applied to a pulse circuit 8 which generates pulses P2 whose lagging edge is delayed by the period T2 relative to the trailing edge of PWM.

Figure 3:
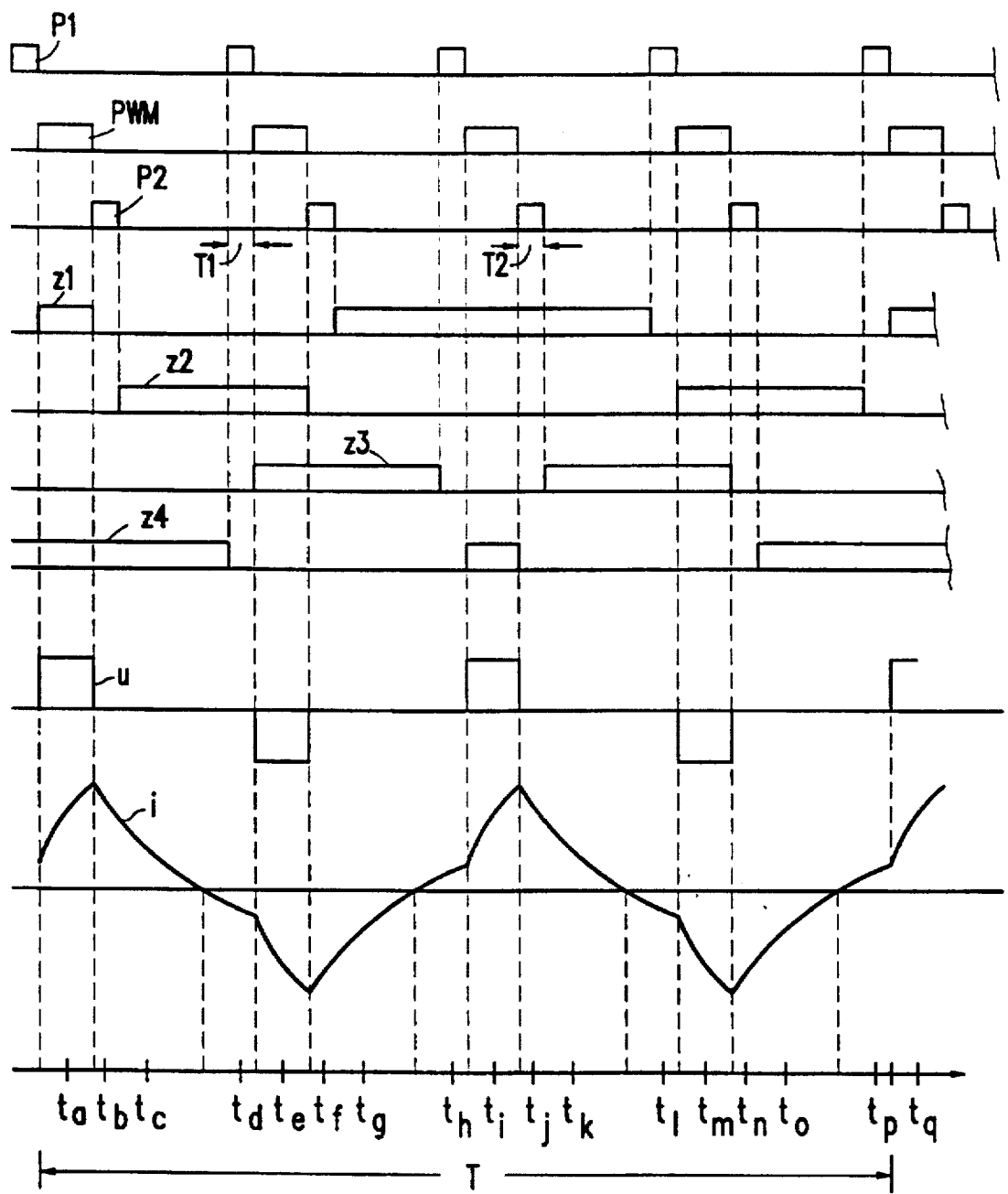
FIG. 3 shows the variation in time of various signals.

The variation in time of the three signals P1, PWM and P2 is represented by the first three lines of FIG. 3. It is not necessary per se, as is shown in the drawing, for the lagging edge of a pulse of P1 to coincide with the leading edge of a pulse PWM or for the leading edge of a pulse P2 to coincide with the trailing edge of a pulse PWM. It is essential only that the leading edge of P1 leads the leading edge of PWM by the period T1 and that the lagging edge of P2 lags the lagging edge of PWM by the period T2. The periods T1, T2 may be equal and should be short in comparison with the period duration of the clock frequency. As will be described in detail hereinafter, for reasons of safety T1 and T2 should not be less than a minimum value.

If the pulse width modulator 6 did not generate the signal P1 in addition to the pulse width modulated signal PWM, the three signals could be derived from the signal PWM by means of suitable delay and pulse circuits.

The three signals P1, PWM and P2 are applied to a logic circuit 9 which combines these signals in such a manner that a pulse pattern for controlling the four switching members of the inverter 1 is generated on its four outputs. The logic circuit 9 is preferably an EPLD or PLD (Erasable Programmable Logic Device) component, i.e. a programmable logic circuit whose combinatory effects can be predetermined by programming. The four switching signals thus generated are applied in a suitable manner with potential separation, for example, via an optocoupler, to the switching inputs of the four switching members included in the inverter 1.

Figure 2:
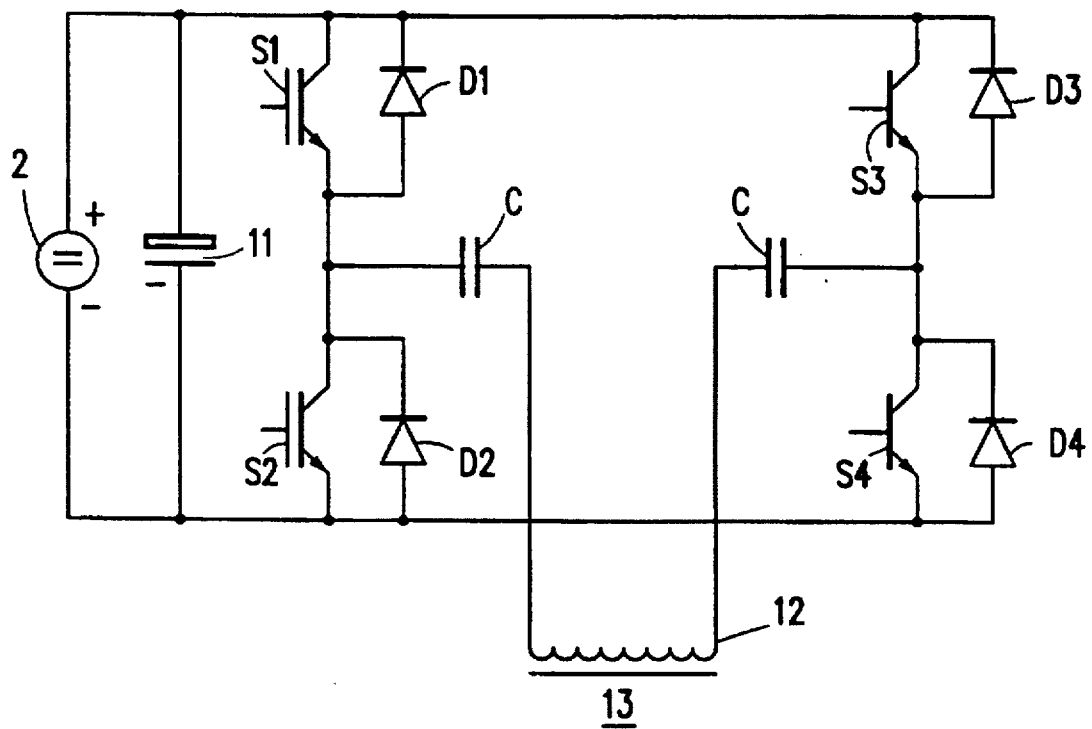
FIG. 2 shows an inverter which is suitable for use therein.

The explanation of the programming of the logic circuit will be preceded by a detailed description of the series resonant inverter 1 with reference to FIG. 2. The inverter comprises a DC voltage source 2 which may comprise, for example, a rectifier device which is connected to a single-phase or multi-phase alternating voltage mains and charges a parallel-connected capacitor 11. Two switching branches, each of which comprises two series-connected switching members, are connected parallel to the DC voltage source 2. Each switching member includes a switch power semiconductor, preferably a transistor, S1 . . . S4 which can be turned on and off and with which a diode D1 . . . D4 is connected in parallel in such a manner that it is operated in the reverse direction by the DC voltage source 10. Therefore, the diodes D1 . . . D4 operate as freewheeling diodes.

The junction of the switches S1, S2 in one switching branch is connected to the junction of the switches S3, S4 in the other switching branch, via the series connection of a capacitor C, the primary winding 12 of the high voltage transformer 13 mentioned with reference to FIG. 1, and a further capacitor C. Instead of the two capacitors, a single capacitor whose capacitance corresponds to the capacitance of the series connection of the two capacitors could be used. The capacitors form, in conjunction with the leakage inductance of the transformer 13, a series remnant circuit whose resonance frequency must be in the range of half the clock frequency (so, approximately 20 kHz in the present example) in order to ensure that a current zero-crossing is always present between two successive voltage halfwaves. The load circuit may also contain further impedances.

The switching signals applied to the four switches S1 . . . S4 are shown on the fourth to seventh line of FIG. 3 and denoted by the references z1 . . . z4. A (positive) pulse means that the switch is switched on (conductive). The necessary programming of the logic circuit so as to produce the desired switching signal pattern is deduced from the variation in time of the four switching signals.

It appears that the lagging edge of one of the switching pulses z1 . . . z4 coincides with each leading edge of a pulse P1, that is to say in the order z4-z3-z1-z2, and that the leading edge of a switching pulse coincides with each lagging edge of a pulse P2 (in the order z2-z1-z3-z4). The leading edge of a switching pulse is always coincident with the leading edge of a PWM pulse (in the order z1-z3-z4-z2) and the lagging edge of a switching pulse always coincides with each trailing edge of a PWM pulse (z1-z2-z4-z3).

The switching pulses z1 . . . z4 produce the variation in time of the voltage u across the series-resonant circuit, as shown on the last line but two in FIG. 3, at half the clock frequency as well as the current i through the series resonant circuit (last line but one of FIG. 3). Various instants $t_a$ . . . $t_p$ are marked on the time scale and in the FIGS. 4a to 4p the switching state of the inverter at these instants is diagrammatically indicated.

Figure 4A:
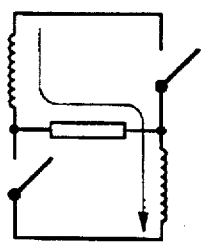
FIGS. 4a to 4p show the switching state of the switches of the inverter at various instants.

In all FIGS. 4a . . . 4p the series resonant circuit is represented by an impedance; the IGBT transistors of the inverter are represented as switches, the closed (conductive or switched-on) state being denoted by heavy lines. All references have been omitted; when references are mentioned nevertheless in the following description of these Figures, they relate to FIG. 2. The freewheeling diodes D1 . . . D4 are shown only if the load current flows therethrough at the instant shown.

FIG. 4a represents the switching state at the instant $t_a$ at which the full DC voltage is present in the series resonant circuit, via the closed diagonal pair S1, S4, energy for feeding the load then being extracted from the DC voltage source 2. The switching state shown in FIG. 4a is initiated by the closing of the switch S1 after previous closing of the switch S4. This switch thus performs a hard (loss-inducing) switch-on operation.

Figure 4B:
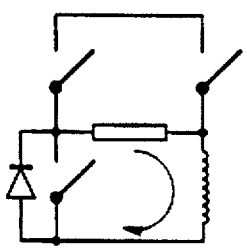

The switching state shown in FIG. 4b occurs at the instant $t_b$, i.e. after the lagging edge of a control pulse PWM and before the lagging edge of the subsequent control pulse P2. The inverter enters this switching state due to hard switching off of the switch S1. The current denoted by an arrow flows through the load in the same direction as before, the circuit being closed via the switch S4 and the diode D2. If S4 were switched off simultaneously with S1 or briefly thereafter, the circuit would be closed via the freewheeling diodes D2 and D3, thus charging the capacitor 11. In other words, energy would then be fed back into the DC voltage source. This would lead to increased losses in the switches, as has already been described. Because one or two switches are switched on at any instant, feeding back of energy from the load into the DC source is effectively avoided.

Figure 4C:
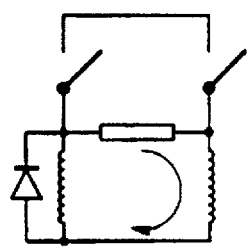

FIG. 4c shows the switching state subsequent to the leading edge of z2 and prior to the zero-crossing of the current i. The current thus continues to flow in the same direction as before because now the switch S2, situated in the same switching branch as the previously switched-off switch S1, is switched on. Because the voltage across this switch already has a low value prior to the switching operation, due to the conductive diode D2, and because furthermore the current in the circuit flows in a direction in which this semiconductor switch S2 cannot conduct current, a loss-free (soft) switch-on operation of the switch S2 occurs.

It will be evident to those skilled in the art that the switching on of the switch S2 may not succeed the switching off of the switch S1 in the same branch at such a short distance in time that there is a risk of short-circuiting. Therefore, the period T2 is proportioned so that this risk is definitely precluded. On the other hand, the period T2 should not be substantially longer than necessary for a short-circuit-free transition from S1 to S2. The period T1 can be proportioned in the same way; however, it may also be shorter, because the current to the switches is already interrupted before the transition from the conductive to the blocked state.

Figure 4D:
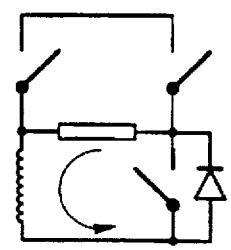

FIG. 4d shows the switching state after the zero-crossing of the load current and after the first lagging edge of the switching pulse z4, but before the leading edge of the next PWM pulse. A zero-crossing of the current means that the current has reversed its direction and now flows via the switch S2 and the diode D4. Since the switch S4 is switched off, this can take place in a loss-free manner after the zero-crossing.

The instants $t_e$ . . . $t_h$, whose switching states are shown in the FIGS. 4a . . . 4h, have the same position in time, relative to the second square-wave voltage pulse U on the load and for the half cycle initiated thereby of the voltage on the load, as the instants $t_a$ . . . $t_d$ in relation to the first square-wave voltage pulse. For the instants $t_i$ . . . $t_l$ (shown in the FIGS. 4i . . . 4l) the same holds in respect of the third half period; finally, the FIGS. 4m . . . 4p show the switching states at the corresponding instants in relation to the fourth half oscillation of u. Consequently, the FIGS. 4e . . . 4p show switching states which are quite analogous to those of the FIGS. 4a . . . 4d, the difference being that for each half oscillation other switches are switched on or off in a hard or soft manner.

Figure 4E:
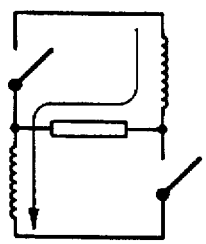
Figure 4F:
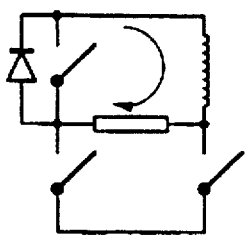
Figure 4G:
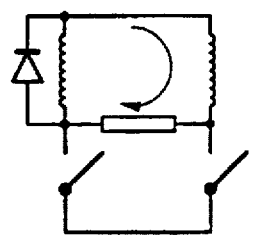
Figure 4H:
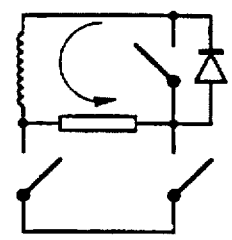
Figure 4I:
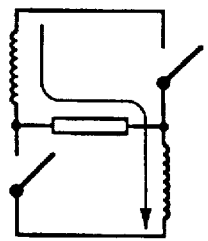
Figure 4J:
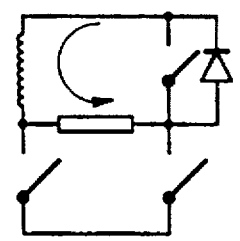
Figure 4K:
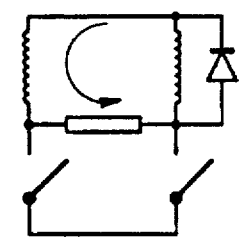
Figure 4L:
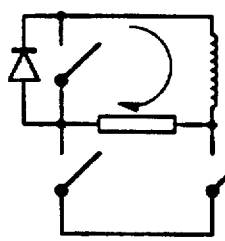
Figure 4M:
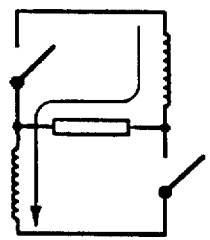

Subsequent to the hard switching on of the switch S3, FIG. 4e is reached in which the square-wave voltage on the load has the opposite polarity and the current through the load has the opposite direction in relation to FIG. 4a. This is succeeded by a hard switch-off operation, in this case for the switch S2 (FIG. 4f), which is followed by a soft switch-on operation (S1, FIG. 4g), and then by a soft switch-off operation (S3, FIG. 4h). Subsequently, the diagonal pair S1, S4 is activated (FIG. 4i) by hard switching on of S4, until the supply of energy by the DC voltage source is blocked by a hard switch-off operation for S4 (FIG. 4j). This is followed by a soft switch-on operation (S2, FIG. 4k) and a soft switch-off operation (S1, FIG. 4l).

Figure 4N:
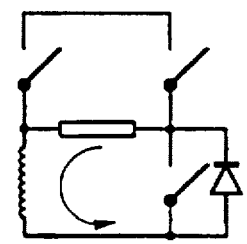
Figure 4O:
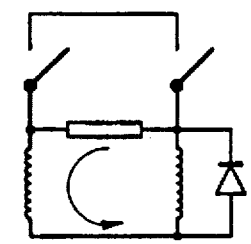

In the last cycle, after the hard switching on of S2 (FIG. 4m) and the hard switching off of S3 (FIG. 4n), a soft switch-on operation is initiated (S4 FIG. 4o) and subsequently a soft switch-off operation (S2, FIG. 4p). Subsequently, S1 is closed again, after which the switching cycle as initiated in FIG. 4a is repeated.

Figure 4P:
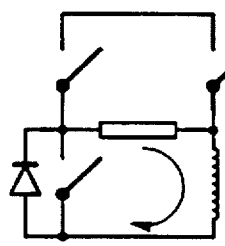

The FIGS. 4a to 4p thus represent the switching states occurring within one period T (at the bottom of FIG. 3) of the pulse pattern z1 . . . z4. This period corresponds to two periods of the alternating voltage in the series resonant circuit or four periods of the clock frequency. It appears that during the freewheeling the load current flows twice in succession via the positive supply voltage lead (FIGS. 4f to 4h and 4j to 4l) and twice in succession via the negative supply voltage lead (FIGS. 4n to 4p and 4b to 4d).

The switching states shown in the FIGS. 4a, 4e, 4i and 4m are reached by the hard switching on of the switches in the following order: S1-S3-S4-S2. This order is repeated in all further periods T. Because of this cyclic switching on and because of the transition from the lagging edge of a voltage pulse to the leading edge of the next voltage pulse in accordance with the invention it is ensured that all switches are "symmetrically" stressed, i.e. during one period each switch S1 . . . S4 is switched on and off once in a hard fashion and once in a soft fashion. In this case the hard switching off also takes place in a cyclic order which is anticyclic relative to the former order: S1-S2-S4-S3. Similar cyclic orders are obtained for the soft switching on and off.

Despite this symmetrical loading, there still is a difference because the switches S1 and S4 are successively switched on and off in a hard fashion in response to a voltage pulse, whereas for the switches S2 and S3 hard switching on is first followed by soft switching off. This small difference in respect of stressing can be avoided in that during the cycle succeeding the switching state shown in FIG. 4p the hard switching on initially does not take place in the order given above (S1-S3-S4-S2), but in the anticyclic order S1-S2-S4-S3, after which the entire order is periodically repeated. The order of the switching members switched on in a hard fashion is then as follows: S1-S3-S4-S2-S1-S2-S4-S3, and the order of hard switching off is then: S1-S2-S4-S3-S4-S2-S1-S3. The period duration would then be twice the duration shown in FIG. 3.

As has already been stated, between the switching on of the voltage u and the switching on of the voltage −u, freewheeling always occurs across the load via a diode and a transistor. When freewheeling during which the load current flows via the upper, positive supply lead is denoted by the symbol "+" and freewheeling via the lower, negative supply lead is denoted by the symbol "−", the pulse pattern which is essential to the invention can also be characterized by the freewheeling order. For the switching states shown in the FIGS. 4a to 4p, the following then holds: −++−, similarly, −++−++− holds for the version with cyclic and anticyclic switching orders.

We claim:

1. A circuit arrangement comprising:
    an inverter having a first and second parallel switching branch which are connected to a DC voltage source,
    each parallel switching branch comprising:
    a first and second series-connected switching member, each switching member comprising at least one switch and an anti-parallel-connected diode,
    the first switching member in the first switching branch forming a first diagonal pair in conjunction with the second switching member in the second switching branch,
    the first switching member in the second switching branch forming a second diagonal pair in conjunction with the second switching member in the first switching branch,
    a load with a given polarity being connectable to the DC voltage source via each of said diagonal pairs, and
    a control circuit for opening and closing the switches in a manner such that the switching members are successively switched on and off,
    wherein the control circuit controls the switching members so that
    the switching members in each diagonal pair are switched on or off in a sequential manner,
    such that no switching member is continually the first member to be sequentially switched.

2. A circuit arrangement as claimed in claim 1, wherein the control circuit produces the following switching cycle after the switching on of both switching members of the first diagonal pair:
    a) opening of the first switching member of the first diagonal pair,
    b) closing of the second switching member of the second diagonal pair,
    c) opening of the second switching member of the first diagonal pair,
    d) closing of the first switching member of the second diagonal pair.

3. A circuit arrangement as claimed in claim 1, wherein; the inverter comprise a series resonant inverter.

4. A circuit arrangement as claimed in claim 1, which further comprises a pulse width modulator for controlling the switching period of the two diagonal pairs.

5. A circuit arrangement as claimed in claim 1, which further comprises
    means for generating a first periodic and pulse-shaped signal (P1) whose leading edge determines the switching off of the switching member switched last in the first diagonal pair,
    means for generating a second periodic and pulse-shaped signal (PWM) whose leading edge is delayed a defined period of time (T1) relative to the leading edge of the first pulse-shaped signal and which defines the switching on of the switching member switched on first in the second diagonal pair, its lagging edge determining the switching off of the switching member switched off first in the second diagonal pair, and
    means for generating a third periodic signal (P2) whose lagging edge is delayed a defined period of time (T2) relative to the lagging edge of the second signal (PWM) and defines the switching on of the switching member switched on first in the first diagonal pair.

6. A circuit arrangement as claimed in claim 5, wherein
    the first and second switching members of the first parallel switching branch constitute a first and second switch, respectively, and
    the first and second switching members of the second parallel branch constitute a third and fourth switch, respectively,
    the control circuit produces respective first, second, third and fourth switching pulses for said first, second, third and fourth switches
    and said periodic pulse signals are generated so that a lagging edge of each switching pulse coincides with a leading edge of a first periodic pulse signal (P1) in the sequence fourth, third, first and second switching pulses
    and the leading edge of each switching pulse coincides with a lagging edge of a third periodic pulse signal (P2) in the sequence second, first, third and fourth switching pulses.

7. A circuit arrangement as claimed in claim 5, wherein the period of time (T2) is chosen to have a minimum value sufficient to preclude the occurrence of a short-circuit due to simultaneous closure of the two series-connected switches in either one of the two parallel switching branches.

8. A circuit arrangement as claimed in claim 1, wherein the switching on of the switching members first takes place in a cyclic order and subsequently in an anticyclic order, whereupon the switching sequence is periodically repeated.

9. A circuit arrangement as claimed in claim 8, wherein
the first and second switching members of the first parallel switching branch constitute a first and second switch, respectively, and the first and second switching members of the second parallel branch constitute a third and fourth switch, respectively, and said cyclic order comprises the first, third, fourth and second switches and the anticyclic order comprises the first, second, fourth and third switches.

10. A circuit arrangement as claimed in claim 1, wherein
the first and second switching members of the first parallel switching branch constitute a first and second switch, respectively, and the first and second switching members of the second parallel branch constitute a third and fourth switch, respectively, wherein the switching members are sequentially switched on in the sequence first, third, fourth and second switches or are switched off in the sequence first, second, fourth and third switches.

11. A circuit arrangement as claimed in claim 1, and means for coupling said circuit arrangement to an X-ray tube of an X-ray generator for generating a high voltage for operation of the X-ray tube.

12. A circuit arrangement as claimed in claim 1, further comprising a load circuit including a series resonant circuit coupled between a first junction point between the first and second series-connected switching members in the first parallel switching branch and a second junction point between the first and second series-connected switching members in the second parallel switching branch.

13. A circuit arrangement as claimed in claim 1, wherein said switches comprise transistors of the same conductivity type.

14. A circuit arrangement as claimed in claim 1, wherein the control circuit controls said switches so that at least one switch is closed at all times in a switching sequence.

15. A DC/AC converter circuit comprising:

a pair of input terminals for connection to a source of DC supply voltage for the converter, first and second switching branches connected in parallel to said pair of input terminals, wherein said first branch includes first and second switching transistors connected in series and first and second diodes connected anti-parallel to said first and second switching transistors, respectively, and the second branch includes third and fourth switching transistors connected in series and third and fourth diodes connected anti-parallel to said third and fourth switching transistors, respectively, said first and fourth switching transistors forming a first diagonal pair and said second and third transistors forming a second diagonal pair, a control circuit coupled to control electrodes of the switching transistors so as to sequentially switch the switching transistors on and off over a given periodic time period such that the switching transistors are switched on and off in a first switching sequence over a first part of the given time period and are switched on and off in a second switching sequence over a second part of the given time period whereby over the given periodic time period the switching transistors have substantially equal switching loses, and means for coupling a load circuit to a first junction point between the first and second switching transistors and to a second junction point between the third and fourth switching transistors.

16. The DC/AC converter circuit as claimed in claim 15, further comprising a pulse width modulator coupled to the control circuit so as to control the switching period of the switching transistors.

17. The DC/AC converter circuit as claimed in claim 15, wherein the switching transistors are switched on and off in the sequence as follows:

starting with the first and fourth switching transistors on, and the second and third switching transistors off, turn the first switching transistor off, turn the second switching transistor on, turn the fourth switching transistor off, turn the third switching transistor on, turn the second switching transistor off, turn the first switching transistor on, turn the third switching transistor off, turn the fourth switching transistor on, turn the fourth switching transistor off, turn the third switching transistor on, turn the first switching transistor off, turn the second switching transistor on, turn the third switching transistor off, turn the fourth switching transistor on, turn the second switching transistor off.

18. The DC/AC converter circuit as claimed in claim 15, wherein the switching transistors are sequentially switched on in the sequence first, third, fourth, and second switching transistors or are switched off in the sequence first, second, fourth and third switching transistors.

19. The DC/AC converter circuit as claimed in claim 15, wherein, with the first and fourth switching transistors of the first diagonal pair turned on, the control circuit switches the switching transistors in the following successive sequence;

switching off the first switching transistor of the first diagonal pair, switching on the series connected second switching transistor of the second diagonal pair, switching off the fourth switching transistor, and switching on the third switching transistor.

* * * * *